June 7, 1955 T. F. THOMPSON 2,710,343

SECRECY SYSTEM FOR TRANSMITTING TELEVISION SIGNALS

Filed Aug. 9, 1950 3 Sheets-Sheet 1

INVENTOR.
Thomas F. Thompson
BY Oliver D. Olson
His Agent

June 7, 1955 T. F. THOMPSON 2,710,343

SECRECY SYSTEM FOR TRANSMITTING TELEVISION SIGNALS

Filed Aug. 9, 1950 3 Sheets-Sheet 2

INVENTOR.
Thomas F. Thompson
BY Oliver D. Olson
His Agent

June 7, 1955 T. F. THOMPSON 2,710,343

SECRECY SYSTEM FOR TRANSMITTING TELEVISION SIGNALS

Filed Aug. 9, 1950 3 Sheets-Sheet 3

INVENTOR.
Thomas F. Thompson
BY Oliver D. Olson
His Agent

United States Patent Office 2,710,343

Patented June 7, 1955

2,710,343

SECRECY SYSTEM FOR TRANSMITTING TELEVISION SIGNALS

Thomas F. Thompson, Eugene, Oreg., assignor of one-fourth to Dale Belford, and one-fourth to Oliver D. Olson, both of Portland, and one-fourth to Richard B. Thompson, Eugene, Oreg.

Application August 9, 1950, Serial No. 178,464

3 Claims. (Cl. 250—6)

This invention pertains to high frequency transmission, and relates particularly to a method of and system for transmitting simultaneously a plurality of audio and/or video signals to a receiver with a minimum of equipment and a maximum of fidelity.

Although the present invention is adaptable for use in transmitting electrical intelligence signals of any conventional source of origin, it is particularly suited to the transmission of the audio and video signals of television systems. A fundamental disadvantage of present day television transmission resides in the extremely high cost of transmitting the signals to areas situated at remote distances from the originating stations. This cost is of such magnitude as to render impractical the transmission of television signals into the rural and other areas of decentralized population which, ironically, comprise the majority population of the United States.

It is a principal object of the present invention to provide a method of and system for transmitting television and other signals for long distances and into sparsely populated areas on a practical economic basis.

Another important object of this invention is the provision of a method and system whereby a plurality of audio and/or video signals may be transmitted for great distances as a single unit and made available at a receiver without the necessity of receiver modification and the provision of expensive power operated auxiliary equipment.

A further important object of this invention is to provide a method of and system for transmitting television and other signals whereby to afford selection at the receiver of any one of a plurality of programs carried upon identical frequencies, thus permitting selection between a local broadcast and a network broadcast carried upon the same channel frequency.

A further object of the present invention is the provision of a method of and system for transmitting one or more television channels to a receiver from a broadcast system separate from but within the range of broadcast of the originating stations without incurring detrimental cross modulation effects, and without interference from or to said originating station.

A further object of this invention is the provision of a method and system whereby a plurality of television channels may be transmitted for long distances as a single unit and made available for selective reception at the conventional home receiver at nominal cost.

A further object of this invention is to provide a novel method of and system for scrambling and unscrambling an electrical intelligence carrier wherein the scramble is utilized to effect said unscrambling.

A further object of this invention is the provision of a novel device for demodulating a modulated carrier wherein said device requires no external source of power for operation.

A still further object of this invention is the provision of a novel device for demodulating and unscrambling a scrambled, modulated carrier wherein said device requries no external source of power for operation.

These and other objects and advantages of the present invention will appear from the following detailed description taken in connection with the accompanying drawings, in which.

Stated broadly, the present invention comprises the transmission of a plurality of television or other electric intelligence signals in the form of a single unit obtained by modulating a master carrier with the several frequency and/or amplitude modulated subcarriers containing said signals and the demodulation of the multi-modulated master carrier at the input of a receiver.

The method of transmission embodying the present invention is described in detail hereinafter with reference to its application in the transmission of television signals. It will be apparent to those skilled in the art, however, that the method is adaptable with equal facility to the transmission of any type of electrical intelligence signal.

Figures 1, 2:
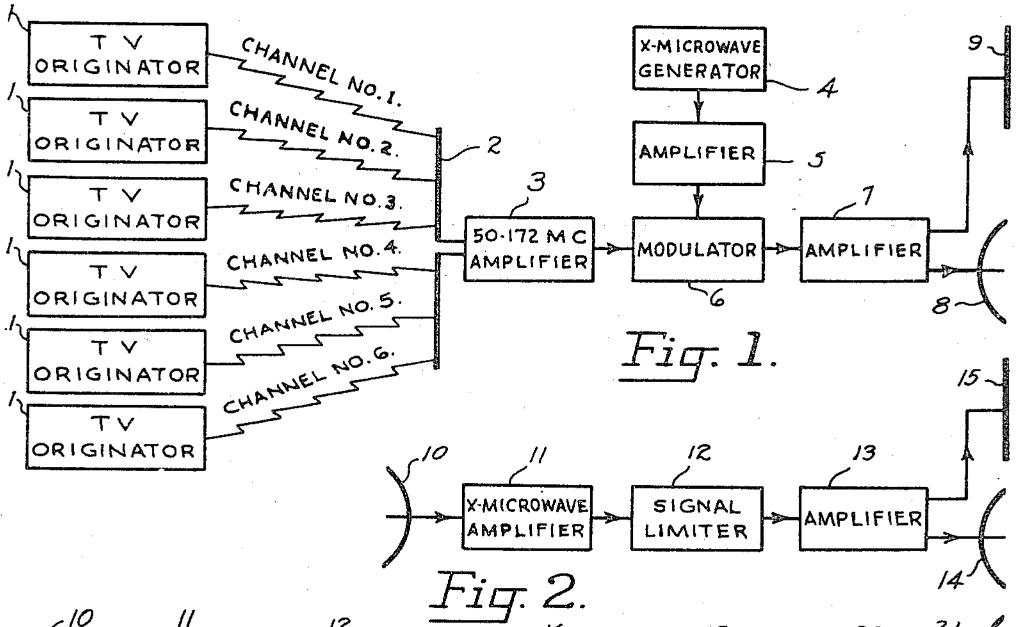
Figure 1 is a block diagram illustrating a form of signal pickup and transmit station embodying the features of the present invention, the same being shown as applied to the transmission of a plurality of television channels.
Figure 2 is a block diagram showing a form of relay station for cooperation with the pickup and transmit station in accordance with the present invention.

Referring to Figure 1 of the drawings, there is shown a plurality of television program originating stations 1, each transmitting upon a carrier frequency different from the others. For convenience, these carriers are designated Channel Nos. 1 to 6, inclusive. Let it be assumed, for purposes of this description, that the carrier frequencies for these channels are within the range of 50 megacycles to 172 megacycles. Assume further that the six originating stations 1 are located within the area of reception by a broad band television receiving antenna 2 which is responsive to the carrier frequency range assumed above. As discussed hereinafter, however, television channels may be added or removed at any point along the course of transmission.

The six television channels, each carrying its respective video and audio intelligence, are picked up by antenna 2 and amplified to proper signal level in amplifier 3 which operates in the range of 50 to 172 megacycles . The amplified signals are then each utilized to amplitude modulate a master carrier of a frequency at least ten times greater than the highest subcarrier frequency. In this example, therefore, let it be assumed that the frequency of the master carrier is 2000 megacycles, hereinafter referred to as *x*-microwave. The *x*-microwave is developed by any type of generator 4 well-known in the art. After sufficient amplification, as at 5, the *x*-microwave is amplitude modulated with the six channels, as shown at 6. The multi-modulated master carrier is then amplified at 7 and transmitted by the directional antenna 8 to a distant pickup and/or by a local non-directional antenna 9 to the home receiver.

The antenna 8 directs the multi-modulated *x*-microwave master carrier to the directional receiving antenna 10 of a relay station (Figure 2) located within line-of-sight distance from antenna 8. The signal is amplified at 11 and passed to a signal limiter 12 wherein the peak distortion attending transmission of the signal through air is corrected. The corrected signal is then amplified at 13 and transmitted by the directional *x*-microwave antenna 14 to the next relay station and/or to a local broadcast station. Optionally, the relay station may function as a local broadcast station by radiating the *x*-microwave signal to the local receivers through the non-directional antenna 15 or by an antenna designed to radiate in a desired pattern.

Figure 3:
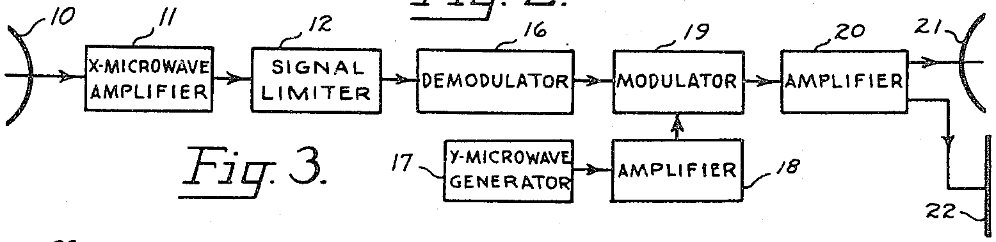
Figure 3 is a block diagram showing a form of relay station modified from Figure 2 to include changing the frequency of the master carrier.

In order to obviate the possibility of cross modulation and other undesirable interference between transmitted signals, it may be desirable to change the frequency of the master carrier alternately between relay stations. Thus, referring to Figure 3, the *x*-microwave master carrier is demodulated at 16 to remove the said carrier. A master carrier of different frequency, such as 2040 megacycles and hereinafter referred to as *y*-microwave, is generated at 17, amplified at 18 and then amplitude modulated at 19 with the six television subcarriers released by demodulation of the *x*-microwave carrier. The multi-modulated *y*-microwave master carrier is then finally amplified at 20 and transmitted by directional antenna 21 either to another relay station or to a local broadcast station. Alternatively, the relay station may function as a broadcast station by radiating the multi-modulated *y*-microwave signal from the non-directional antenna 22, or from an antenna designed to radiate a desired pattern.

The next succeeding relay station thus receives a *y*-microwave carrier, and therefore its receiving antenna 10 must be constructed accordingly. The amplifier 11, signal limiter 12 and demodulator 16 must also be constructed for response to the *y*-microwave signal, while generator 17, amplifiers 18, 19 and 20, and antennas 21 and 22 must be constructed to operate on *x*-microwave.

Figure 4:
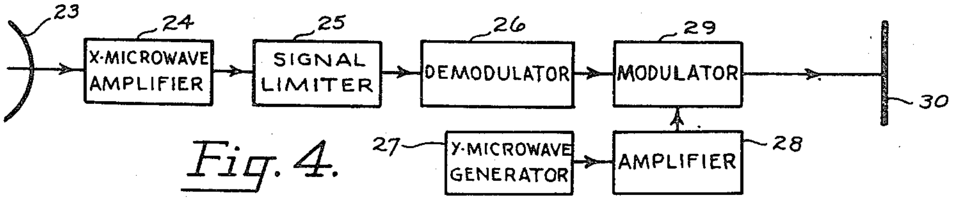
Figure 4 is a block diagram showing a form of local broadcast station embodying features of the present invention.

At the local broadcast station, as shown in Figure 4 of the drawings, a directional *x*-microwave receiving antenna 23 picks up the multi-modulated master carrier. The signal is amplified at 24, the peak distortion is corrected by limiter 25, and then the corrected *x*-microwave carrier is removed at the demodulator 26. At this stage the six television subcarriers are returned to the identical form in which they were transmitted from the originating stations 1. A master carrier of *y*-microwave frequency is generated at 27 in well-known manner, amplified at 28 and then amplitude modulated with the six television subcarriers, as shown at 29. The multi-modulated *y*-microwave master carrier is now amplified and radiated by a non-directional antenna 30, or by an antenna designed to radiate in a desired pattern, into the local area of population for reception in the home.

Figure 5:
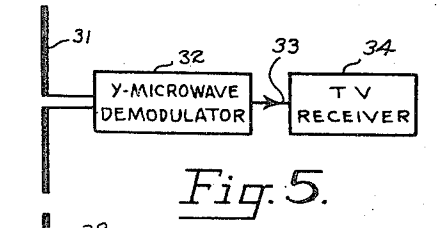
Figure 5 is a block diagram illustrating the manner in which the carrier transmitted by the stations shown in Figures 3 and 4 is treated whereby to make a plurality of television channels available for selection at conventional television receiver.

Referring to Figure 5, the multi-modulated *y*-microwave carrier is received at the home by a non-directional *y*-microwave antenna 31 and passed to a demodulator 32 wherein the *y*-microwave carrier is removed. The six television subcarriers thus released are transmitted by the usual feeder line 33 to the input of a conventional television receiver 34. The six subcarriers are identical in form with those developed at the originating stations 1 and therefore are immediately available for selection at the receiver 34.

Figure 6:
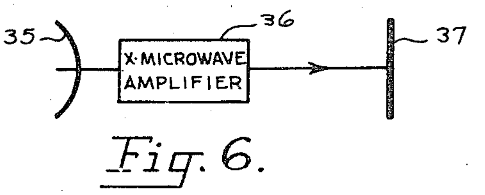
Figure 6 is a block diagram showing a modified form of local broadcast station.
Figure 7:
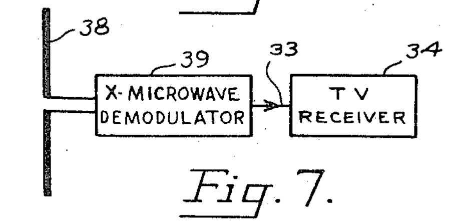
Figure 7 is a block diagram similar to Figure 5 and illustrating the manner in which the carrier transmitted by the stations shown in Figures 1, 2 and 6 is treated for adaptation to a conventional television receiver.

The purpose of changing from *x*-microwave to *y*-microwave at the local broadcast station is to obviate the possibility of interference at the home receiver between the relayed *x*-microwave signal and the rebroadcast signal. Such interference might occur when the rebroadcast signal is of the same carrier frequency as the relayed signal. It is intended, however, that where rebroadcast on the same carrier frejuency as the relayed signal is permissible, the same may be done if desired. In such cases, the receiving antenna 35, amplifier 36 and radiating antenna 37 of the local broadcast station, as shown in Figure 6, and the receiving antenna 38 and demodulator 39 for the home receiver 34, as shown in Figure 7, are constructed to be responsive to the *x*-microwave signal.

Figures 8, 9, 10:
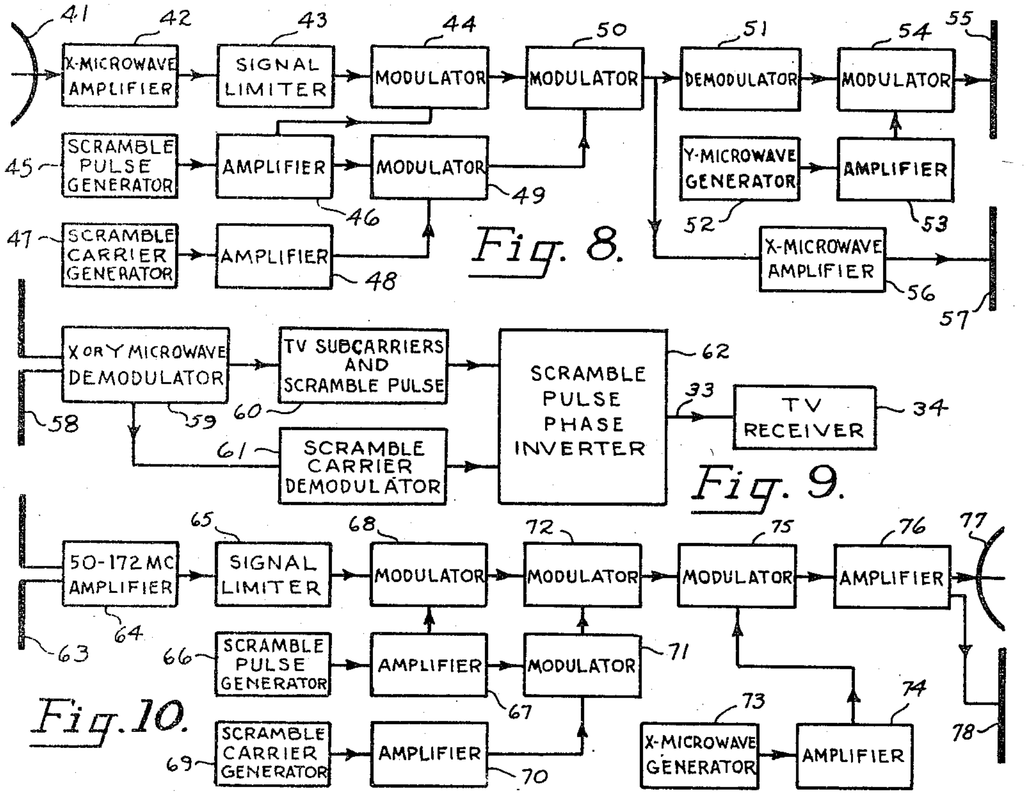
Figure 8 is a block diagram illustrating a further modified form of local broadcast station wherein is provided means for scrambling a master carrier.
Figure 9 is a block diagram showing the manner in which a modulated and scrambled carrier is treated preliminary to introduction at a receiver.
Figure 10 is a block diagram showing a form of pickup and transmit station modified from Figure 1 to include means for scrambling the master carrier.

A modification of the system described hereinbefore involves the scrambling of the master carrier. In Figure 8 is shown a modified broadcast station in which the directional antenna 41 receives the multi-modulated *x*-microwave signal from one of the antennas 8, 14 or 21, shown in Figures 1, 2 and 3, respectively. The received signal is amplified at 42, the peak distortion corrected by limiter 43 and the signal is then modulated at 44 with a scramble pulse of any desired configuration such, for example, as a 100 cycle sine wave produced by generator 45 and amplified at 46. A secondary carrier of, for example, 45 megacycles, generated at 47 and amplified at 48 is also modulated with the scramble pulse at 49. This scrambled secondary carrier is then employed to amplitude modulate the multi-modulated *x*-microwave carrier, as at 50.

The scrambled *x*-microwave carrier may now be demodulated at 51 to release the six television subcarriers and the scramble-modulated secondary carrier. A *y*-microwave master carrier generated at 52 and amplified at 53 is now amplitude modulated at 54 with said seven subcarriers. The scrambled *y*-microwave master carrier is then radiated by antenna 55 as previously described. Alternatively, the scrambled *x*-microwave signal produced at 50 may be amplified at 56 and radiated by antenna 57. As a further alternative, the *x*-microwave master carrier may be demodulated prior to introduction of the scramble. In this case the scramble may be added either before or after modulation of the *y*-microwave master carrier.

Referring to Figure 9, the scrambled master carrier is received on antenna 58 and passed to a demodulator 59 wherein the said master carrier is removed. The antenna and demodulator are constructed to respond to either the *x*-microwave or the *y*-microwave, depending upon which signal is radiated from the broadcast station illustrated in Figure 8. In either case the master carrier is removed, leaving the six original television subcarriers, the scrambled secondary carrier and the scramble pulse. The six television subcarriers and the scramble pulse are separated at 60 from the scrambled secondary carrier. The scramble carrier is then demodulated at 61 to leave the scramble pulse. Said isolated scramble pulse is then fed to a phase inverter 62 along with the six television subcarriers and the scramble pulse. The isolated scramble pulse is therein inverted, whereby to place it 180° out of phase with the scramble pulse accompanying the television subcarriers. The entire scramble pulse is thereby removed, leaving the six television subcarriers in the identical form in which they were transmitted from the originating stations 1. These subcarriers are passed through the usual feeder line 33 to the conventional television receiver 34.

Figure 10 of the drawings illustrates a system wherein the scramble is introduced at the original television pickup station. The six television channels operating within the range of 50 megacycles to 172 megacycles, as in the foregoing example, are picked up by the receiving antenna 63, amplified at 64 and corrected for peak distortion by limiter 65 as described hereinbefore. The scramble pulse generated at 66 and amplified at 67 is mixed with the six television channels at 68. The scramble carrier of 45 megacycles previously exemplified and generated at 69 is amplified at 70 and modulated with the scramble pulse at 71. This scramble-modulated carrier is then mixed with the six television channels and scramble pulse at 72. The mixture of signals is now employed to modulate an *x*-microwave master carrier generated at 73, amplified at 74 and introduced with said signals at 75. The multi-modulated and scrambled *x*-microwave master carrier is finally amplified at 76 and transmitted by directional antenna 77 either to a relay station or to a local broadcast station, or it is radiated by the nondirectional antenna 78 as a local broadcast. In the former option, one or more of the relay stations and local broadcast stations described hereinbefore are employed, and a demodulator and unscrambler such as is illustrated in Figure 9 is provided preferably at the home receiver to complete the transmission system.

The demodulation and unscrambling of the scrambled multi-modulated master carrier may be accomplished in various ways and by various means. The system illustrated in Figure 11 of the drawings is preferred primarily because it requires no external source of power. In this system the receiving antenna 80 is connected to a resonant circuit comprising coil 81 and condenser 82. This circuit is broadbanded to carry the television subcarriers and the scramble carrier. Thus, in the foregoing example, the resonant circuit is designed to carry from 45 megacycles to 172 megacycles on either the *x*-microwave or the *y*-microwave master carrier.

Coil 81 is coupled to coil 83 which, together with condenser 84, forms a resonant circuit having a band pass in accordance with the foregoing example of from 50 megacycles to 172 megacycles on either *x* or *y* microwave carrier. Said resonant circuit 83, 84 is so constructed that the scramble carrier of 45 megacycles is not passed or is at least about 40 decibels down. The input side of crystal detectors 85, 86 are connected to opposite ends of the tuned circuit 83, 84 while their output sides are connected together.

Another resonant circuit comprising coil 87 and condenser 88 is connected at one end between the output sides of the crystal detectors and at the opposite end to the electrical center of coil 83. Condenser 89 placed in shunt with this resonant circuit functions as a demodulating filter for either the *x*-microwave or *y*-microwave carrier. The resonant circuit 87, 88 is constructed, for the foregoing example, to pass the 50 megacycle to 172 megacycle television subcarriers. The coil 87 is coupled to coil 90 which forms a tuned circuit with condenser 91 having characteristics similar to the resonant circuit 87, 88. The tuned circuit 90, 91 is connected to the feeder lines 92 which lead to the input of a conventional television receiver (not shown).

Coil 93 is also coupled to coil 81 and forms a resonant circuit with condenser 94. Said resonant circuit is tuned sharply to 45 megacycles which, in the foregoing example, is the frequency of the scramble carrier. The scrambled carrier is thus separated from the six television subcarriers which are passed through the resonant circuit 83, 84. The input sides of crystal detectors 95 and 96 are connected, respectively, to opposite ends of the tuned circuit 93, 94, while their output sides are connected together. Coil 97 is connected at one end between the output sides of detectors 95 and 97 and at the opposite end to the electrical center of coil 93. The 45 megacycle demodulating filter condenser 98 is placed in shunt with coil 97. The latter is coupled 180° out of phase with coil 90. In this manner the scramble pulse fed through coil 87 to coil 90 is bucked out by the identical scramble pulse entering coil 90 from coil 87. Thus, the scramble pulse is eliminated and the six television subcarriers are fed through line 92 to the conventional television receiver in the identical form in which they are produced at the originating stations 1. The final stage of the demodulator and unscrambler is isolated from the preliminary stage by shield 99. The entire unit is isolated by shield 100 to protect the former from external electrical influences.

Figure 11:
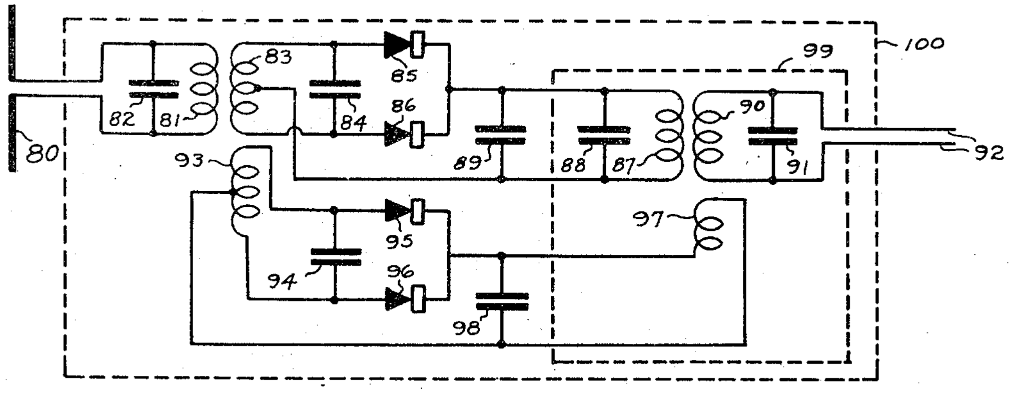
Figure 11 is a diagrammatic view of a demodulator and unscrambler device embodying features of the present invention.

It is to be noted here that, in the event the master carrier is not scrambled, the elements 93 to 98, inclusive, as shown in Figure 11, have no function and therefore may be eliminated if desired.

Figure 12:
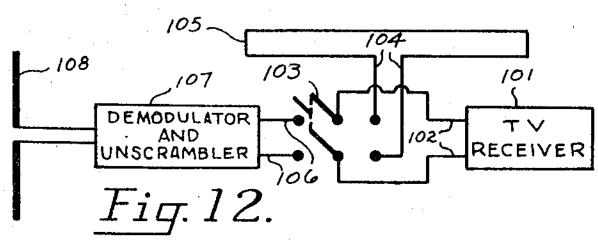
Figure 12 is a block diagram, partially schematic, illustrating the manner in which a conventional television receiver may selectively receive different programs carried on identical transmitter channels.

It will be apparent to those skilled in the art that the present invention provides for selective reception of one of two programs carried on separate channels having identical carrier frequencies. As an illustration, suppose that one program on channel number one is being transmitted to a distant city by means of the system described hereinbefore and that a local program is being originated in said distant city on channel number one. Referring to Figure 12, the conventional home television receiver 101 may be connected through the usual feeder line 102 to a switch 103. One pair of terminals on the switch are connected through line 104 to the conventional antenna 105. The other pair of switch terminals are connected through lines 106 and the demodulator and unscrambler 107 to the microwave antenna 108. In this manner the viewer may select either the local program by switching to the conventional antenna 105 or the distant program transmitted on the microwave carrier by switching to antenna 108.

Figure 13:
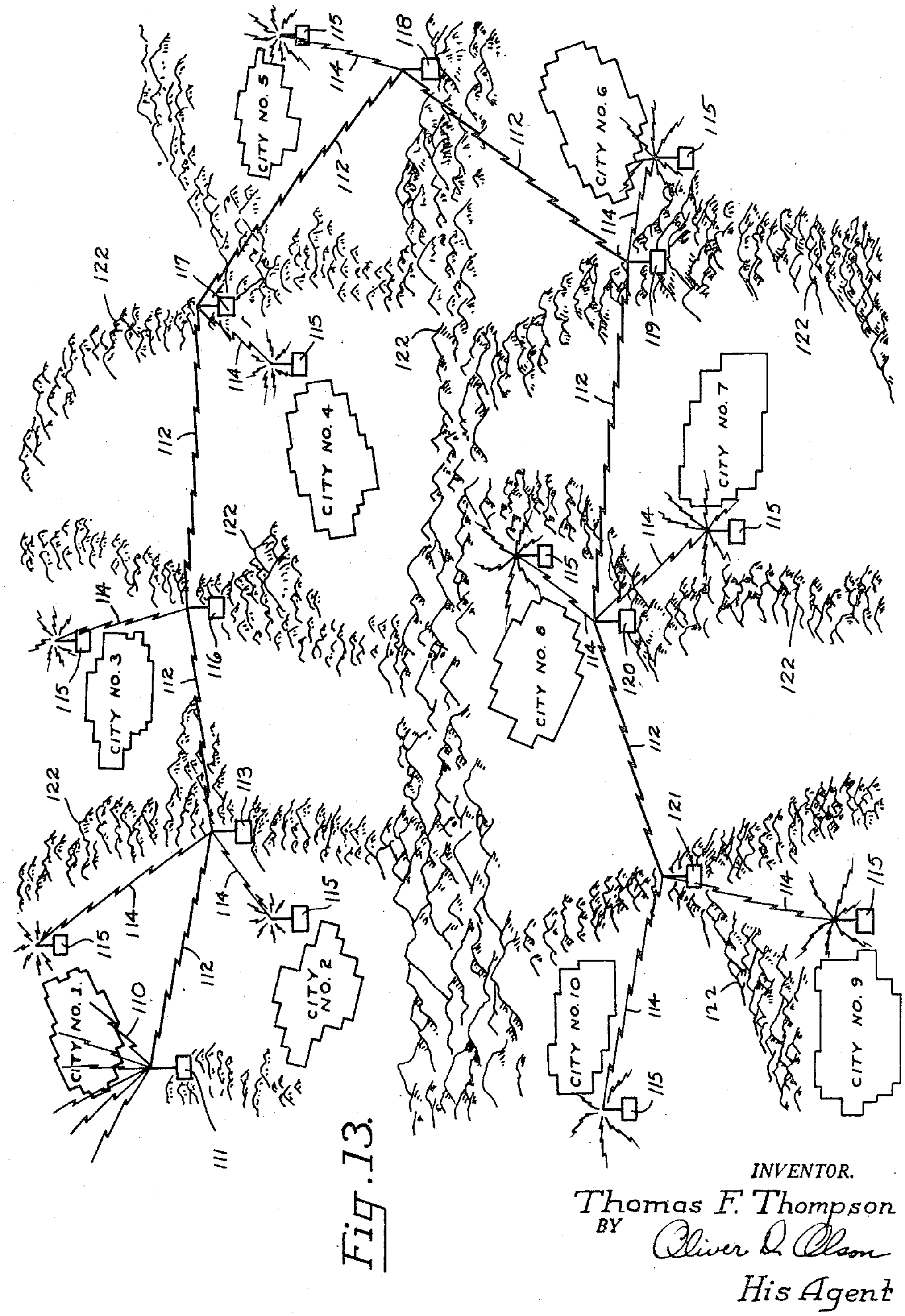
Figure 13 is an area map illustrating schematically the method and system embodying the features of this invention.

Referring now to Figure 13 of the drawings, the operation of the present invention as applied to television is as follows: Let it be assumed that six television program originating stations are located at City No. 1. The signals 110 of these stations are picked up by the broadband antenna of the pickup and transmit station 111. Here the signals 110 are utilized to modulate a microwave master carrier as described hereinbefore. The multi-modulated microwave carrier may also be scrambled, if desired, at the pickup and transmit station as illustrated in Figure 10 of the drawings. In either case the multi-modulated carrier 112 is then transmitted to relay station 113 located within line-of-sight distance from the pickup and transmit station 111. Here the frequency of the microwave carrier is preferably changed to avoid interference from and with the relayed carrier 112, although the frequency need not be changed if performance is satisfactory. In addition, the carrier may be scrambled at the relay station, if not previously done at the pickup and transmit station, for transmission to local broadcast stations. In any case, the relay station 113 illustrated in Figure 13 transmits a multi-modulated master carrier 114 to local broadcast stations 115 at City No. 1 and at City No. 2.

At the local broadcast station the carrier 114 is preferably converted to a different frequency to avoid interference from and with the carrier 114, as illustrated in Figure 4 of the drawings This new carrier may also be scrambled at the local broadcast station, as shown in Figure 8, if the scramble has not been introduced earlier. The multi-modulated master carrier is, in any case, then radiated within the area for pickup by conventional television receivers, as explained hereinbefore.

The master carrier 112 transmitted to relay station 113 is also relayed on to another relay station 116 located within line-of-sight distance from station 113. As explained hereinbefore, the master carrier transmitted from station 113 to station 117 may be changed, if desired, to a frequency different from the carrier transmitted from the pickup and transmit station 111 to the relay station 113. Relay station 116 in turn transmits a multi-modulated master carrier 114 to the local broadcast station 115 at City No. 3, as previously explained. Each succeeding relay station 117, 118, 119, 120 and 121 relays the master carrier 112 through the chain to the local broadcast stations located at Cities No. 4, 5, 6, 7, 8, 9 and 10, respectively, in the foregoing manner.

In Figure 13 the various cities are shown as being isolated between mountainous ranges 122 but grouped together within a relatively small area. It will be apparent to those skilled in the art that several relay stations may be required to transmit the multi-modulated carrier between cities and other localities separated by greater distances.

Let it now be assumed, for purposes of the following discussion, that City No. 7 is provided with an originating station broadcasting on the frequency of channel No. 1. Assume further that channel No. 1 is also assigned to an originating station at City No. 1. The residents of City No. 7 are afforded the option of receiving on channel No. 1 the program originating at City No. 1 by switching to the microwave antenna 108, or of receiving on channel No 1 the program originating at their own City No. 7 by switching to the conventional antenna 105 provided for their television receivers. In this manner, the residents of any city or locality are afforded the privileges of selecting any one of the several programs available either from distant originating stations or from their local originating stations.

It will be apparent to those skilled in the art that various changes may be made in the method and system described hereinbefore without departing from the scope and spirit of this invention. For example, the present invention has been described hereinbefore with reference to television as presently established. Thus, in Figures 1 and 10 are shown receiving antennas 2 and 63, respectively, designed to receive a group of carriers representing various television channels being transmitted in conventional manner. It is to be understood, however, that the foregoing method and system may be applied directly at an originating station where one or more programs are being produced.

In similar manner, Figures 5, 7, 9 and 12 show the demodulating and unscrambling system as a unit separate from the conventional television receiver. It is apparent that a television receiver may be constructed with either or both the demodulator and unscrambler forming an integral part thereof. As a further modification, either or both the demodulator and unscrambler may be applied at the local broadcast station, instead of at the input of the conventional receiver, whereby to radiate the subcarriers for general reception.

It is to be observed that the foregoing description has been based upon the transmission and reception of television as presently established. Present television systems generally transmit frequency modulated audio signals and amplitude modulated video signals. It is to be understood that, if desired, the video signals may be converted to or originally applied to frequency modulate its carrier without departing from the spirit of the present invention. Such procedure is considered to be less practical, however, in view of the present construction of home receivers. In addition, the procedure is complicated by present limitations which do not permit the use of a frequency band of sufficient spread to accommodate a plurality of frequency modulated signals.

It is to be observed further in the foregoing description that the subcarriers have been employed to amplitude modulate a master carrier. It is believed apparent to those in the art that the master carrier may be frequency modulated with the subcarriers without departing from the scope and spirit of this invention. Such procedure is considered of less practical value, however, in view of presently established limitations on the band width of transmitting carriers and also in view of the present construction of home television receivers.

It is to be further understood that the multi-modulated master carrier may be transmitted by means of coaxial cable rather than through the air, if so desired. From an economical consideration, however, transmission by means of the relay stations described hereinbefore is preferred.

From a consideration of the foregoing description, it is apparent that the present invention provides a system of such simplified arrangement as to render economically practicable the transmission of a plurality of television programs to small communities and rural areas. In contrast, television as presently established in unavailable to these many areas of small population because these areas cannot support the high cost of operating each of the several expensive local stations presently required to furnish a reasonable number of programs. In the present invention, however, the equipment required for the system is relatively inexpensive and requires a minimum of attendance. For example, the pickup and transmit station comprises a receiver, a microwave generator, a modulator, a transmitter and, optionally, a scrambler. The relay station comprises a receiver, a transmitter and, optionally, a demodulator, a microwave generator and a modulator. The local broadcast station comprises a receiver, a transmitter and, optionally, various combinations of a demodulator, a microwave generator, a modulator, a scrambler. The television receiver at the home or other location requires only an unpowered demodulator and, optionally, an unscrambler.

Various methods may be employed for operating the system of the present invention on a practical economic basis. For example, the entire chain may be controlled by an originating station producing one or more programs, with the demodulator and unscrambler for the home receiver either forming an integral part of the latter or being sold or rented as a separate unit. Alternatively, the pickup and transmit station and the relay stations may be operated as a network to furnish a plurality of programs from several existing originating sttaions. Operators of local broadcast stations might receive revenue from the sale or rental of demodulating and unscrambling units within the local area.

The present invention may also be utilized economically to furnish a large variety of programs originating at distant sources for use in theatres, schools and other centers where people gather for entertainment and instruction.

Although the foregoing detailed description of the present invention has employed television as a convenient illustration, those skilled in the art will recognize that the invention may be utilized for the transmission of electrical intelligence in various other forms. For example, conventional radio broadcasts as presently transmitted by amplitude or frequency modulated carriers may be employed individually or collectively to modulate a microwave master carrier for transmission as hereinbefore described. Telephone and other forms of communication may be transmitted in similar manner. It is intended, therefore, that the term electrical intelligence, as recited in the appended claims, includes all forms of video, audio, supersonic and other types of electrical signals which are capable of modulating a carrier wave.

Having now described the present invention and the manner in which the same may be used, what is desired to be secured by Letters Patent is:

1. A system for transmitting electrical intelligence, comprising means supplying a subcarrier modulated with an electrical intelligence signal, means supplying a scramble signal and a subcarrier modulated with said scramble signal, means supplying a master carrier, means for modulating the master carrier with said subcarriers and scramble signal, means for transmitting the multi-modulated master carrier, means for receiving the transmitted master carrier, demodulator means for releasing the subcarriers and scramble signal, tuned means for isolating the scrambled subcarrier, demodulator means for releasing the scramble signal from said subcarrier, means for combining the released scramble signal 180° out of phase with the scramble signal in the intelligence subcarrier whereby to eliminate the scramble signal from the latter, and means for transmitting the subcarrier to the input of a receiver.

2. A system for transmitting television, comprising means supplying a plurality of subcarriers each modulated with a video and an audio signal, means supplying a scramble signal and a subcarrier modulated with said scramble signal, means supplying a master carrier, means for modulating the master carrier with said subcarriers and scramble signal, means for transmitting the multi-modulated master carrier, means for receiving the transmitted master carrier, demodulator means for releasing the subcarriers and scramble signal, tuned means for isolating the scrambled subcarrier, demodulator means for releasing the scramble signal from said subcarrier, means for combining the released scramble signal 180° out of phase with the scramble signal in the television subcarriers whereby to eliminate the scramble signal from the latter, and means for transmitting the subcarriers to the input of a television receiver.

3. In a system for transmitting electrical intelligence signals including means supplying a plurality of subcarriers modulated with said signals, means for modulating a master carrier with part of said subcarriers, means for modulating the master carrier with a scramble signal and a subcarrier modulated with said scramble signal, and a receiver including an antenna constructed to receive the said intelligence subcarriers; an antenna responsive to the master carrier, demodulator means connecting the master carrier antenna for removing the master carrier whereby to release the subcarriers, means connecting the demodulator for removing the scramble signal and subcarrier, comprising tuned means for isolating the scrambled subcarrier, demodulator means for releasing the scramble signal from said subcarrier, means for combining the released scramble signal 180° out of phase with the scramble signal in the intelligence subcarriers whereby to eliminate the scramble signal from the latter, and switching means for selectively connecting the antennas to the said receiver.

References Cited in the file of this patent

UNITED STATES PATENTS

| | | |
|---|---|---|
| 1,480,217 | Mills | Jan. 8, 1924 |
| 1,692,877 | Vreeland | Nov. 27, 1928 |
| 1,733,414 | Knapp | Oct. 29, 1929 |
| 2,028,212 | Heising | Jan. 21, 1936 |
| 2,106,806 | Latimer | Feb. 1, 1938 |
| 2,228,815 | Deerhake | Jan. 14, 1941 |
| 2,233,183 | Roder | Feb. 25, 1941 |
| 2,245,674 | Huetwohl, Jr. | June 17, 1941 |
| 2,272,385 | Salzberg | Feb. 10, 1942 |
| 2,358,382 | Carlson | Sept. 19, 1944 |
| 2,414,101 | Hogan | Jan. 14, 1947 |
| 2,458,124 | Wilmotte | Jan. 4, 1949 |
| 2,481,516 | Jacobsen | Sept. 13, 1949 |
| 2,508,853 | Bond | May 23, 1950 |
| 2,510,046 | Ellett et al. | May 30, 1950 |
| 2,514,425 | Thompson | July 11, 1950 |
| 2,545,770 | Ellett et al. | Mar. 20, 1951 |